US011648863B2

(12) United States Patent
Cho et al.

(10) Patent No.: US 11,648,863 B2
(45) Date of Patent: May 16, 2023

(54) SUPPORT DRIVER FOR SEAT AND SUPPORT ASSEMBLY INCLUDING SAME

(71) Applicant: DAECHANG SEAT CO., LTD-DONGTAN, Hwaseong (KR)

(72) Inventors: Chan Ki Cho, Gangwon-Do (KR); Gun Young Park, Incheon (KR); Jin Oh Kim, Osan (KR); Jun Kyu Park, Hwaseong (KR); Jeon Il Kang, Cheonan (KR)

(73) Assignee: DAECHANG SEAT CO., LTD-DONGTAN, Hwaseong-Si (KR)

( * ) Notice: Subject to any disclaimer, the term of this patent is extended or adjusted under 35 U.S.C. 154(b) by 0 days.

(21) Appl. No.: 17/368,052

(22) Filed: Jul. 6, 2021

(65) Prior Publication Data
US 2022/0340062 A1 Oct. 27, 2022

(30) Foreign Application Priority Data

Apr. 21, 2021 (KR) ........................ 10-2021-0051457

(51) Int. Cl.
*B60N 2/90* (2018.01)
*B60N 2/66* (2006.01)

(52) U.S. Cl.
CPC ............. *B60N 2/914* (2018.02); *B60N 2/665* (2015.04)

(58) Field of Classification Search
CPC .......... B60N 2/914; B60N 2/665; B60N 2/66; B60N 2/64; B60N 2/68; B60N 2/7029; B60N 2/7082; B60N 2/7094
USPC ..................................................... 297/284.1
See application file for complete search history.

(56) References Cited

U.S. PATENT DOCUMENTS

| 6,273,810 B1 * | 8/2001 | Rhodes, Jr. .......... A47C 27/083 297/452.47 |
| 10,974,634 B2 | 4/2021 | Ceglarek et al. |
| 2009/0108654 A1 * | 4/2009 | Petzel .................... B60N 2/986 297/284.1 |

(Continued)

FOREIGN PATENT DOCUMENTS

DE 102008047249 A1 3/2010
EP 1726476 A2 11/2006

(Continued)

OTHER PUBLICATIONS

Search Report issued in corresponding European Patent Application 21182391 dated Oct. 5, 2021.

(Continued)

*Primary Examiner* — Mark R Wendell
(74) *Attorney, Agent, or Firm* — Harness, Dickey & Pierce, P.L.C.

(57) ABSTRACT

A support driver for a seat and a support assembly including the same that is using a tube and a structure of a mat that is moved by an inflation and a deflation of the tube. According to an embodiment of the present disclosure, the support driver coupled to a seat frame includes: a support portion coupled to the seat frame; a tube coupled to the support portion; and a mat coupled to the support portion so as to allow the mat to be movable in a direction that is away from the support portion or in a direction that is adjacent to the support portion, with the tube being provided therebetween, in which the tube is configured to push the mat by being inflated according to an operation of a pump that is connected to the tube by a hose.

6 Claims, 6 Drawing Sheets

(56) References Cited

U.S. PATENT DOCUMENTS

| | | | |
|---|---|---|---|
| 2011/0285189 A1* | 11/2011 | Petzel | B60N 2/667 |
| | | | 297/284.1 |
| 2013/0062920 A1 | 3/2013 | McDiarmid | |
| 2014/0125102 A1 | 5/2014 | McMillen et al. | |
| 2014/0125103 A1* | 5/2014 | Suzuki | B60N 2/0232 |
| | | | 297/284.7 |
| 2018/0178694 A1* | 6/2018 | McMillen | B60N 2/914 |
| 2020/0198511 A1* | 6/2020 | Golles | B60N 2/99 |
| 2021/0162901 A1* | 6/2021 | Cho | A47C 7/467 |
| 2021/0309378 A1* | 10/2021 | Fahey | B64D 25/10 |
| 2022/0015545 A1* | 1/2022 | Freeman Lea | A47C 27/085 |

FOREIGN PATENT DOCUMENTS

| | | | |
|---|---|---|---|
| EP | 3569106 | * | 11/2019 |
| JP | S635846 U | | 1/1988 |
| JP | 201312946 A | | 1/2013 |
| JP | 2014205468 A | | 10/2014 |
| JP | 201574245 A | | 4/2015 |
| JP | 2016196283 A | | 11/2016 |
| KR | 100805475 B1 | | 2/2008 |
| KR | 101006730 B1 | | 1/2011 |
| KR | 20150058581 A | | 5/2015 |
| KR | 200480360 Y1 | | 5/2016 |
| WO | 2018112596 A1 | | 6/2018 |

OTHER PUBLICATIONS

Office Action issued in corresponding Indian Patent Application 202114029899 dated Nov. 7, 2022.

Office Action issued in corresponding Japanese Patent Application 2021-109485 dated Jul. 11, 2022.

Office Action issued in corresponding Korean Patent Application 10-2021-0051457 dated Nov. 11, 2022.

\* cited by examiner

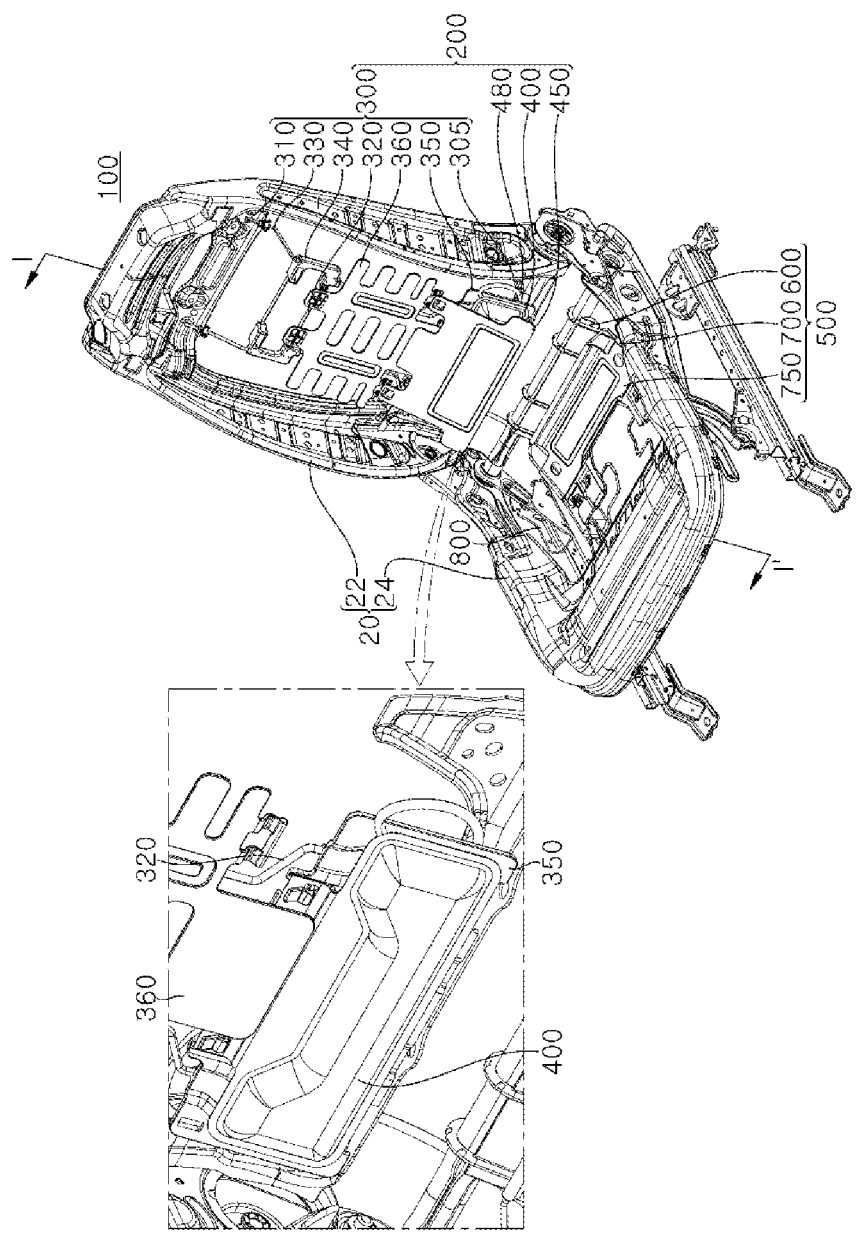
[Fig. 1]

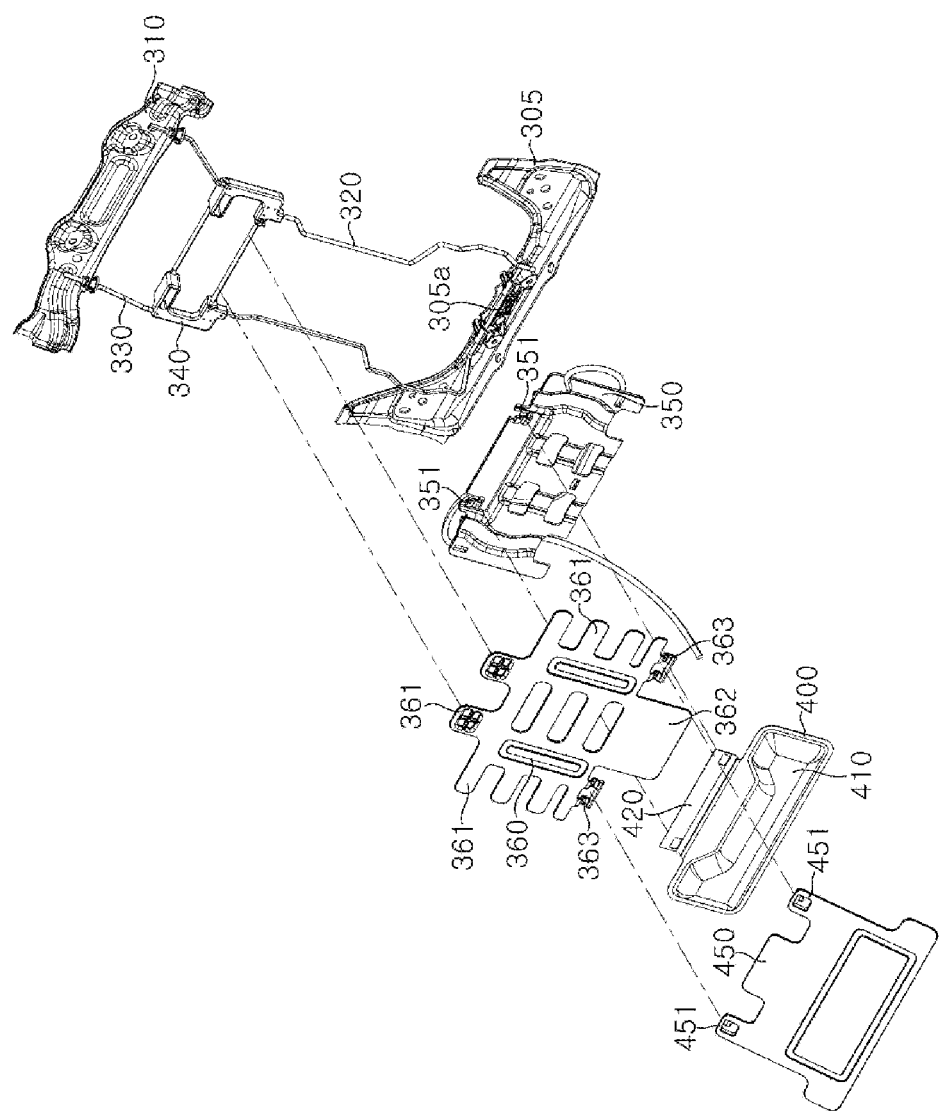
[Fig. 2]

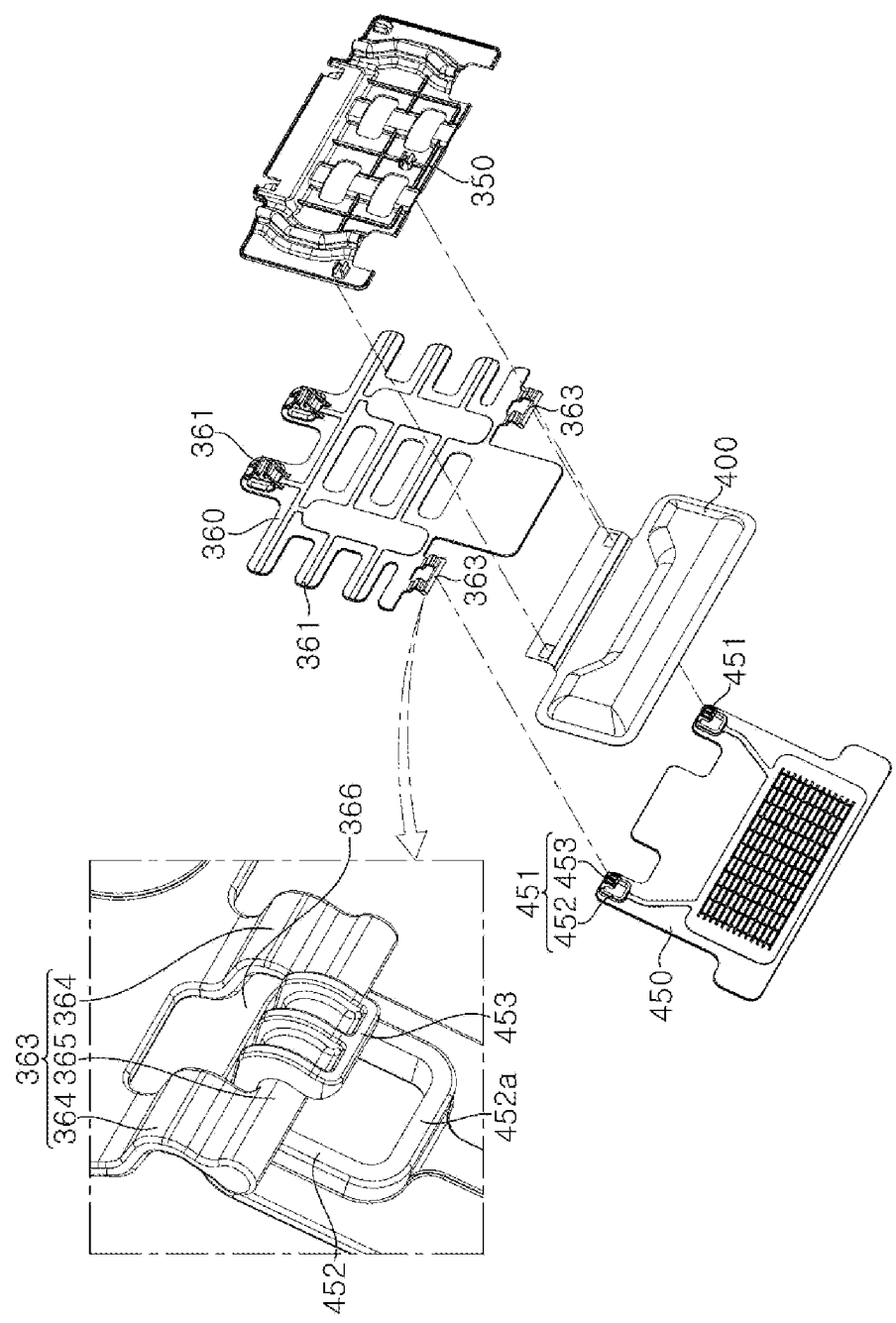
[Fig. 3]

[Fig. 4]
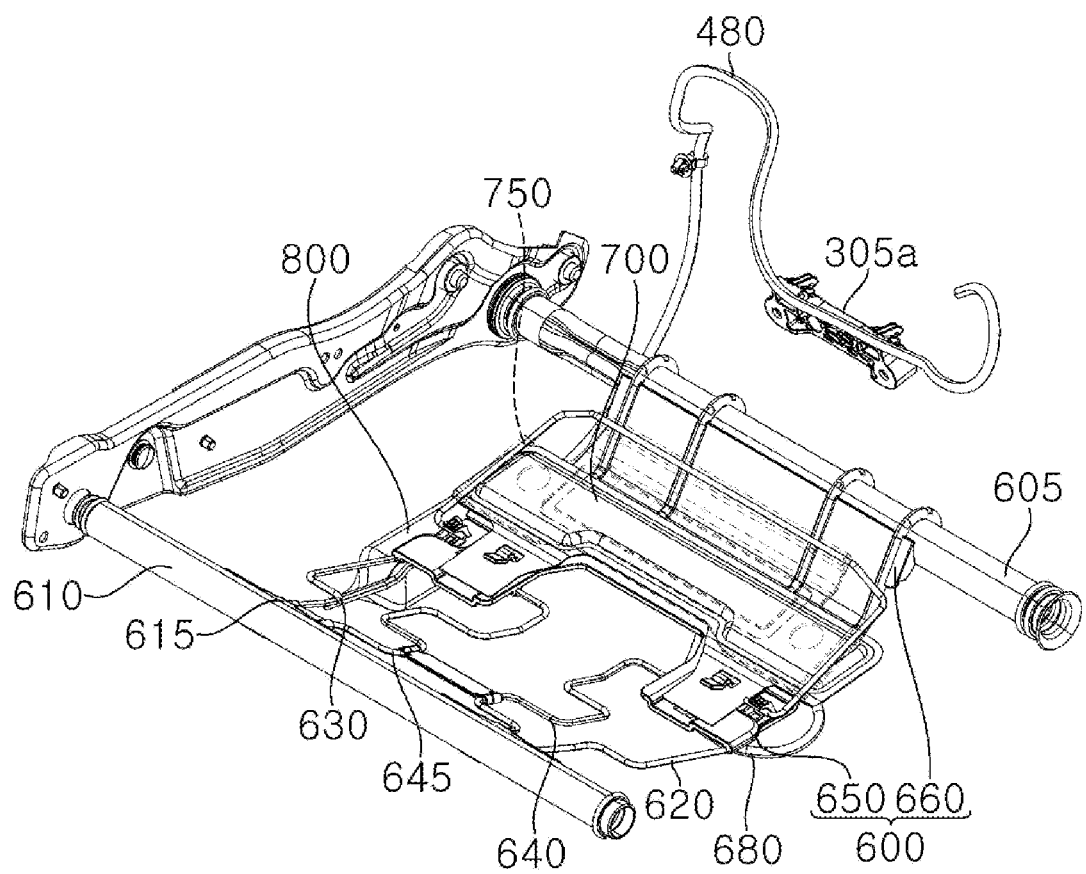

[Fig. 5]
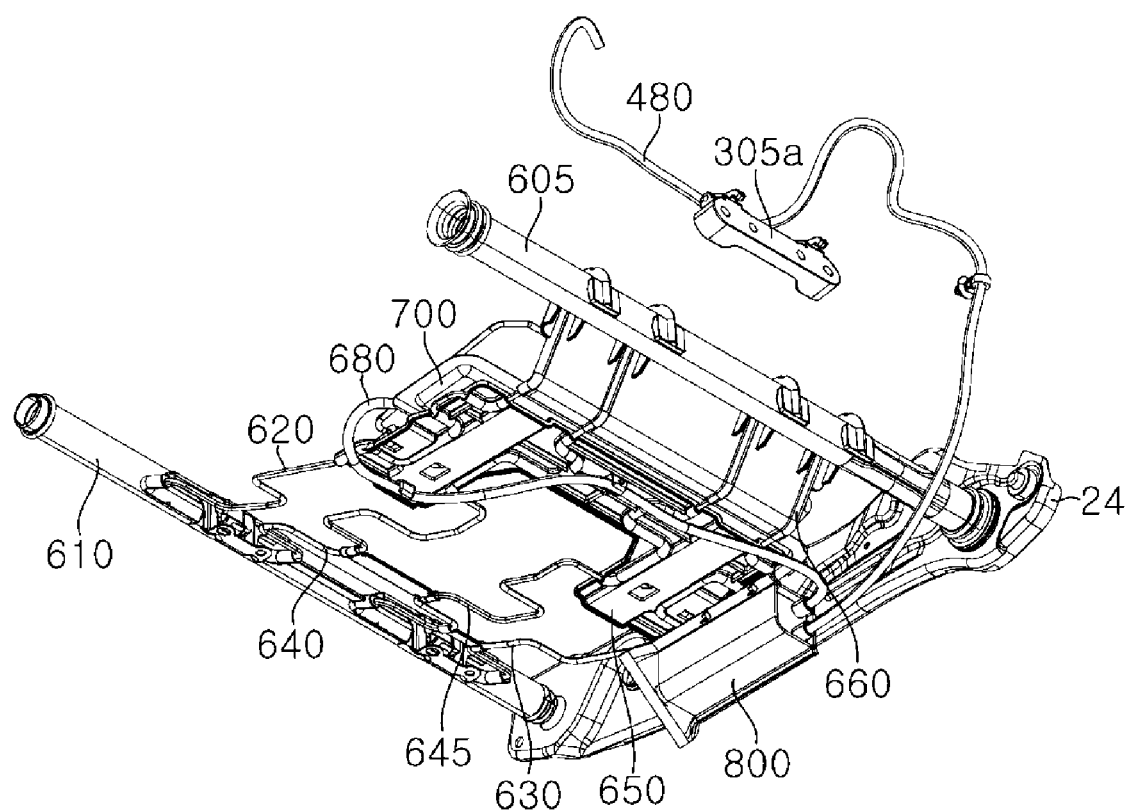

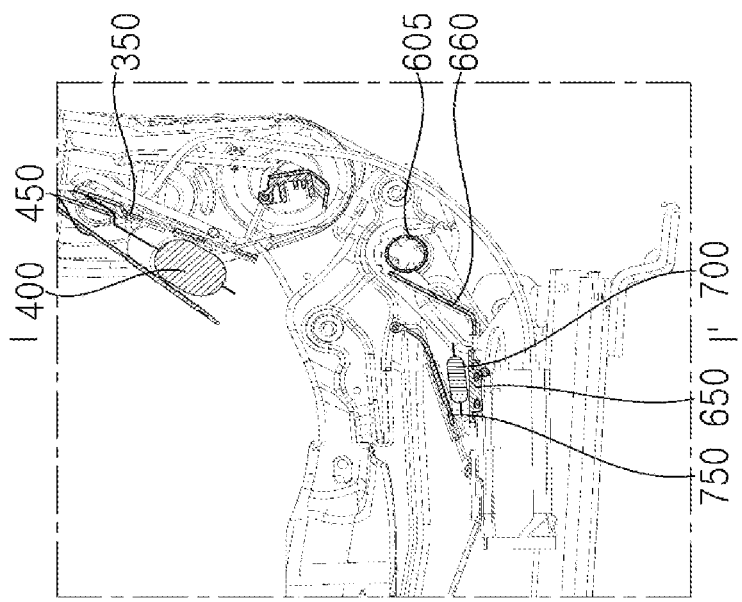
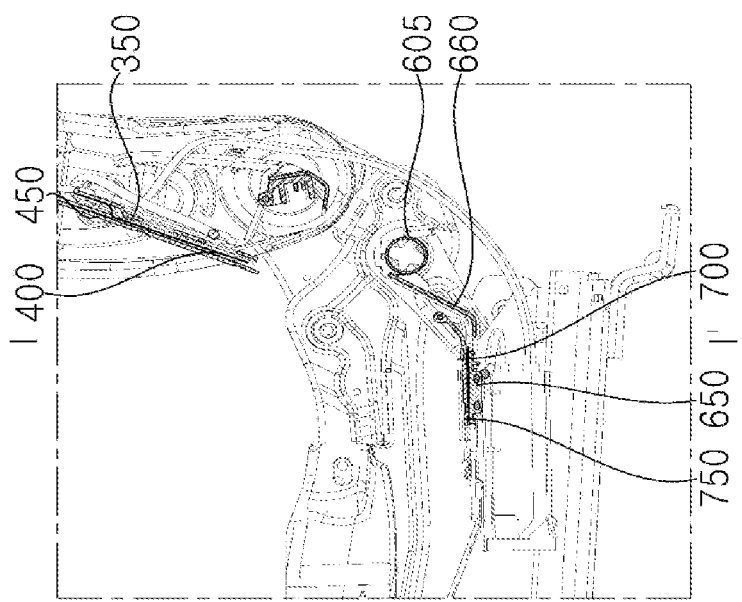
[Fig. 6]

SUPPORT DRIVER FOR SEAT AND SUPPORT ASSEMBLY INCLUDING SAME

CROSS REFERENCE TO RELATED APPLICATION

The present application claims priority to Korean Patent Application No. 10-2021-0051457, filed Apr. 21, 2021, the entire contents of which is incorporated herein for all purposes by this reference.

BACKGROUND OF THE INVENTION

Field of the Invention

The present disclosure relates to a support driver for a seat and a support assembly including the same. More particularly, the present disclosure relates to a support driver for a seat, in which the support driver supports an occupant by being coupled to a seat frame of a vehicle, and to a support assembly including the support driver.

Description of the Related Art

Unless otherwise indicated herein, the descriptions set forth in this identification are not the related art to the claims of this application and are not to be recognized as the related art as described herein.

A seat may be equipped with a seat cushion that supports the buttocks of an occupant, a seat back that supports the back of the occupant, an armrest on which the occupant can rest his/her arms, and a headrest that supports the head of the occupant, and is configured to be adjustable to a shape suitable for the occupant through control by the occupant.

In the case of seat support apparatus that supports around a pelvis of an occupant and adjusts a position of the occupant, products having various structures have been manufactured or researched, but there is a need of reducing a weight of the seat support apparatus by manufacturing same with as few components as possible in order to increase performance and a fuel efficiency of a vehicle.

In addition, in order to be embedded in seats of various sizes applied to various vehicle types, a structure capable of being transformed in a limited space and also capable of supporting a body of an occupant comfortably and stably is necessary.

In this regard, Korean Patent No. 10-1006730 discloses a lumbar support, and Korean Patent No. 10-0805475 discloses a support apparatus for a vehicle seat.

However, these existing inventions cannot provide techniques that can minimize the weight of a support assembly by reducing the number of components constituting the support assembly, and can be operated in a limited space.

The foregoing is intended merely to aid in the understanding of the background of the present disclosure, and is not intended to mean that the present disclosure falls within the purview of the related art that is already known to those skilled in the art.

DOCUMENTS OF RELATED ART (Patent Document 1) Korean Patent No. 10-1006730
(Patent Document 2) Korean Patent No. 10-0805475

SUMMARY OF THE INVENTION

Accordingly, the present disclosure has been made keeping in mind the above problems occurring in the related art, and an objective of the present disclosure is to provide a support driver for a seat, wherein a manufacturing cost, a volume, and a weight thereof are reduced through a tube and a structure of a mat that is moved by an inflation and a deflation of the tube, and to provide a support assembly including the same.

The objectives of the present disclosure are not limited to the above-mentioned objective, and further objectives will be derived from the following description.

According to an embodiment of the present disclosure, there is provided a support driver coupled to a seat frame, the support driver including: a support portion coupled to the seat frame; a tube coupled to the support portion; and a mat coupled to the support portion so as to allow the mat to be movable in a direction that is away from the support portion or in a direction that is adjacent to the support portion, with the tube being provided therebetween, wherein the tube is configured to push the mat by being inflated according to an operation of a pump that is connected to the tube by a hose.

Furthermore, the support portion may be formed in a quadrangle plate shape and coupled to the seat frame, and is rotatably coupled to the mat.

According to another embodiment of the present disclosure, there is provided a support assembly including: a first support driver including: a first support portion coupled to a seat back frame; a first tube coupled to a front side of the first support portion; and a first mat coupled to the first support portion so as to be movable frontward and rearward from front of the first tube, a second support driver including: a second support portion coupled to a cushion frame; a second tube coupled to an upper portion of the second support portion; and a second mat coupled to the second support portion so as to be movable upward and downward from a top portion of the second tube, and a pump coupled to a lower portion of the cushion frame and configured to supply air by being connected to the first tube and to the second tube by a hose.

Furthermore, the first support portion may include: a first support bracket coupled to the seat back frame from a rear side of the first tube; and a second support bracket rotatably coupled to the first mat from an upper portion of the first support bracket with respect to a shaft extending toward opposite sides of the shaft.

Furthermore, the second support portion may include: a third support bracket coupled to a front side of the cushion frame from a lower portion of the second tube and rotatably coupled to the second mat; and a fourth support bracket having a first end coupled to a rear side of the third bracket, and having a second end formed in a hook shape and coupled to a rear side of the cushion frame.

Furthermore, the second mat may have a first end formed in a plate shape and a portion of a front border of the second mat is rotatably coupled to the third support bracket, and the second mat may have a second end extending rearward and upward from the first end thereof by a predetermined distance.

Furthermore, each of opposite sides of the third support bracket may be partially bent frontward and may protrude rearward to form an arch shape.

According to the embodiment disclosed herein, the support assembly has an effect that a pelvis of an occupant seated in a seat is supported comfortably thereby since the support assembly is coupled to the seat frame that includes the seat back frame and the cushion frame, and is transformed through control by the occupant.

Furthermore, the support assembly has an effect that the number of components and a weight thereof are reduced compared to an existing mechanical support assembly since the support assembly is operated with the tube that is inflated or deflated pneumatically and with the mat that is mechanically rotated.

Furthermore, the support assembly has effects that motion sickness of an occupant is prevented and a driving stability is improved since the support assembly prevents shaking of an occupant caused by a transformation of a tube compared to an existing pneumatic support assembly that is inflated or deflated only in a pneumatic manner.

Furthermore, the support assembly has effects that a weight of the support assembly is reduced by using the tube, the number of components required to push the mat is reduced, and the support assembly can be efficiently used in a slim seat since a volume of the support assembly is reduced while the tube is in a deflated state.

In addition, the effects of the present disclosure are naturally exhibited from the specification of the present disclosure irrespective of whether the inventors recognize the effects of the present disclosure. Consequently, the effects of the present disclosure are some effects of the present disclosure based on the specification of the present disclosure, and do not include all effects that the inventors have found or that actually exist.

In addition, the effects of the present disclosure are further recognized through the specification of the present disclosure. Although not described directly, any effects that can be recognized by those skilled in the art to which the present disclosure pertains from the specification of the present disclosure may be included in the effects of the present disclosure.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a view illustrating a use state of a support assembly according to an embodiment of the present disclosure;

FIG. 2 is an exploded perspective view illustrating a first support driver illustrated in FIG. 1;

FIG. 3 is an exploded perspective view illustrating a first support driver illustrated in FIG. 1;

FIG. 4 is a perspective view separately illustrating a second support driver illustrated in FIG. 1;

FIG. 5 is a perspective view separately illustrating a second support driver illustrated in FIG. 1; and FIG. 6 shows cross-sectional views illustrating a driving of the support assembly of FIG. 1.

DESCRIPTION OF THE PREFERRED EMBODIMENTS

Hereinafter, the configuration, operation, and effect of a support driver for a seat and a support assembly including the same according to exemplary embodiments will be described with reference to the accompanying drawings. For reference, in the drawings, each component is omitted or schematically illustrated for convenience and clarity of illustration, and the size of each component does not completely reflect a real size. Further, the same reference numerals are used throughout the different drawings to designate the same or similar components. In the individual drawings, reference numerals for the same components will be omitted.

As illustrated in FIGS. 1 to 6, a support assembly 100 includes a seat frame 20, a first support driver 200, a second support driver 500, and a pump 800.

The support assembly 100 is coupled to the seat frame 20 that includes a seat back frame 22 and a cushion frame 24, and is configured to be transformed by control by an occupant such that a pelvis of the occupant seated in a seat is supported comfortably.

In addition, the support assembly 100 has an effect that the number of components and a weight thereof are reduced comparing to an existing mechanical support assembly since the support assembly 100 is operated with a tube that is inflated or deflated pneumatically and with a mat that is mechanically rotated.

In addition, the support assembly 100 has effects that a motion sickness of an occupant is prevented and a driving stability is improved since the support assembly 100 prevents shaking of an occupant caused by a transformation of a tube comparing to an existing pneumatic support assembly that is inflated or deflated only in a pneumatic manner.

The first support driver 200 includes a first support portion 300, a first tube 400, a first mat 450, and a first hose 480.

The first support driver 200 is coupled to the seat back frame 22, and is configured to allow the first mat 450 disposed in front of the first tube 400 to be moved frontward or rearward by an inflation or a deflation of the first tube 400 that is disposed in rear of the first mat 450.

The first support portion 300 includes a lower bracket 305, an upper bracket 310, a first support member 320, a second support member 330, a first bracket 340, a first support bracket 350, and a second support bracket 360.

The first support portion 300 is coupled to the seat back frame 22 in a space formed inside the seat back frame 22 and coupled to the first tube 400 disposed in front of the first support portion 300, so that the first support portion 300 supports the first tube 400 so as to allow the first tube 400 to be inflated frontward.

The lower bracket 305 is formed in a bracket shape extending toward a first side or a second side thereof and the first side and the second side of the lower bracket 305 are coupled to a first side and a second side of the seat back frame 22, respectively, and the lower bracket 305 is coupled to the first support member 320 by a coupling member 305a.

The upper bracket 310 is formed in a bracket shape extending toward a first side or a second side thereof at an upper portion of the seat back frame 22, and the first side and the second side of the upper bracket 310 are coupled to the first side and the second side of the seat back frame 22, respectively.

A portion of a first side and a portion of a second side of the first support member 320 are bent upward perpendicularly and coupled to the first bracket 340, and a lower portion of the first support member 320 is coupled to the lower bracket 305 by the coupling member 305a.

A portion of a first side and a portion of a second side of the second support member 330 are bent upward perpendicularly and coupled to the upper bracket 310, and a lower portion of the second support member 330 is coupled to the first bracket 340 by being inserted to the first bracket 340.

The first bracket 340 is formed in a rectangular frame shape having an inside space opened downward, and a portion of a lower border of the second support frame 330 is exposed to a lower portion of the first bracket 340 with being in a state in which the second support member 330 is coupled to the first bracket 340.

The first support bracket 350 is formed in a quadrangle plate shape having a plurality of through-holes in a center portion thereof and the first support bracket 350 is disposed in front of a lower portion of the first support member 320, and a portion of the first side and a portion of the second side of the first support member 320 are inserted to opposite sides of the first support bracket 350, respectively.

Hanging members 351 having a hook shape extending frontward and upward are formed at the opposite sides of an upper portion of the first support bracket 350, respectively, and are coupled to the first tube 400 disposed in front of the first support bracket 350.

The second support bracket 360 has a plurality of through-holes in a center portion thereof and has protrusions 361 in opposite sides and an upper border thereof, and has a fixing plate 362 in a lower portion thereof.

The protrusions 361 formed at the upper portion of the second support bracket 360 are rotatably coupled to a portion of the second support member 330, in which the portion of the second support member 330 is exposed outside to the lower portion of the first bracket 340, with respect to a shaft extending toward a first side or a second side.

A lower surface of the second support bracket 360, which is opposite sides of the fixing plate 362, has hanging members 363, and the hanging members 363 are rotatably coupled to the first mat 450, respectively.

Specifically, referring to FIG. 3, each of the hanging members 363 includes bent members 364 and a rotation shaft 365.

Each first end of each of the bent members 364 is connected to the lower surface of the second support bracket 360 in a position spaced apart from each other on opposite sides, and each second end of each of the bent members 364 is extending downward in a protruding rearward arch shape.

The rotation shaft 365 is formed in a cylindrical shape extending toward a first side or a second side thereof, a portion of the first side of the rotation shaft 365 and a portion of the second side of the rotation shaft 365 are connected to the second end of the bent members 364, respectively, and a hook groove 366 is formed between a center portion of the rotation shaft 365 and the second support bracket 360.

The first tube 400 includes an inflation member 410 and a fixing member 420.

The first tube 400 is formed in a quadrangle plate shape and coupled in front of the first support portion 300 being detachable and attachable, and is inflated frontward or deflated by the pump 800 connected through the first hose 480.

The inflation member 410 is formed in a quadrangle shape having a sealed space inside thereof and the inflation member 410 is connected to the pump 800 through the first hose 480, and is inflated frontward when air is supplied into the space inside.

A first end of the fixing member 420 is bent rearward perpendicularly from an upper border of the inflation member 410 and formed in a plate shape extending toward a first side and a second side thereof, and a second end of the fixing member 420 is bent upward from the first end of the fixing member 420.

A rear surface of the fixing plate 362 is in surface contact with a front surface of the fixing member 420 while the second end of the fixing member 420 is in surface contact with a front surface of an upper end of the first support bracket 350, and the hanging members 351 are penetrating through each opposite side surface of the fixing member 420 such that the hanging members 351 protrude frontward.

Therefore, there are advantages in that the first tube 400 applies a pressure that is allowing a weight of an upper body of an occupant applied to the second support bracket 360 to be moved rearward by the fixing plate 362, and the first tube 400 is tightly coupled to the first support bracket 350.

The first mat 450 is formed in a quadrangle plate shape and disposed in front of the first tube 400, and a lower end portion thereof is rotatably moved frontward with respect to an upper portion thereof being a shaft by an inflation of the first tube 400.

Each upper portion of a first side and a second side of the first mat 450 has a hook member 451, and the hook member 451 is protruding rearward in a hook shape and rotatably coupled to the hanging member 363 so as to be rotated with respect to a shaft extending toward a first side and a second side thereof.

Specifically, the hook member 451 includes a hook body 452 and a hook 453.

The hook body 452 is formed in a quadrangle plate shape having a quadrangle hollow in a center portion thereof, and a protruding portion 452a formed by a portion of an inner surface adjacent to the quadrangle hollow protruding rearward is in close contact to a front surface of the rotation shaft 365.

In a first end of the hook 453, reinforcing members extending frontward and rearward are spaced apart to have the same distance from a first side and a second side thereof, and are formed in a reinforcing plate shape extending rearward and connected to an upper end of the hook body 452.

A second end of the hook 453 is bent and extends downward perpendicularly from the first end thereof while maintaining a shape of the first end thereof, and is formed to surround rearward of the rotation shaft 365 while the hook 453 is coupled to the center portion of the rotation shaft 365.

The hook 453 penetrates through the hook groove 366 and is moved rearward of the hanging member 363, and opposite side surfaces of the hook 453 are in close contact with each of the bent members 364 while the hook 453 surrounds the center portion of the rotation shaft 365.

Therefore, when the first mat 450 is coupled to bent members 364 by the hook members 451, a rotation movement of the first mat 450 with respect to a shaft extending from a center portion of the first mat 450, in which the shaft divides the first mat 450 into an upper portion and a lower portion from the center portion of the first mat 450, is prevented by the close contact structure between the hook 453 and the bent members 364.

In addition, during a process of the lower portion of the first mat 450 being moved frontward or rearward with respect to an extending direction of the rotation shaft 365, the first side and the second side of the first mat 450 are moved by the same distance, so that there is an advantage in that an upper body of an occupant is supported comfortably.

In addition, different pressures are applied to the first side and the second side of the first mat 450 when the first tube 400 is inflated, there are advantages in that a deformation of the bent members 364 is prevented due to the bent structure of the bent members 364, and a rotation of the hook 453 with respect to the shaft that divides the first mat 450 into the upper portion and the lower portion from the center portion of the first mat 450 is prevented.

The first mat 450 has a greater comfort than a pneumatic support assembly that is operated by a tube only since the first mat 450 rotates through the rotation shaft 365 without being twisted even when the first tube 400 is deflated by a weight of an occupant.

The second support driver 500 includes a second support portion 600, a second hose 680, a second tube 700, and a second mat 750.

The second support driver 500 is coupled to the cushion frame 24 with being detachable and attachable, and is configured to allow the second mat 750 disposed in an upper portion of the second support driver 500 to be moved upward or downward by an inflation or a deflation of the second tube 700 that is disposed in a lower portion of the second mat 750.

Referring to FIGS. 4 and 5, the second support member 600 includes a rotation shafts 605 and 610, a front bracket 615, a first lower support member 620, a second lower support member 630, a third lower support member 640, a fourth lower support member 645, a third support bracket 650, and a fourth support bracket 660.

The second support portion 600 is coupled to the cushion frame 24 in a space formed inside the cushion frame 24, and is support a lower portion of the second tube 700 when the second tube 700 is inflated by the pump 800.

The rotation shaft 605 is formed in a cylindrical shape extending toward a first side or a second side thereof and the first side and the second side of the rotation shaft 605 are coupled to a first side and a second side of rearward of the cushion frame 24, and the rotation shaft 605 is coupled to the fourth support bracket 660.

The rotation shaft 610 is formed in a cylindrical shape extending toward a first side or a second side thereof and the first side and the second side of the rotation shaft 610 are coupled to the first side and the second side of frontward of the cushion frame 24, and the rotation shaft 610 is coupled to the front bracket 615.

Each of the front brackets 615 is disposed in a position space apart by a predetermined distance in front of the fourth support bracket 660, and is coupled to the first side and the second side of the rotation shaft 610 while each of the brackets 615 is spaced apart from each other to the first side and the second side of the rotation shaft 610.

A first end of the first lower support member 620 is inserted to a first side of the fourth support bracket 660, and a second end of the first lower support member 620 penetrates through the third support bracket 650 and extending frontward, so that the second end of the first lower support member 620 is coupled to the front bracket 615 disposed in a first side.

A first end of the second lower support member 630 is inserted to a second side of the fourth support bracket 660, and a second end of the second lower support member 630 penetrates through a second side of the third support bracket 650 and extending frontward, so that the second end of the second lower support member 630 is coupled to the front bracket 615 disposed in a second side.

A first end of the third lower support member 640 is inserted to the fourth support bracket 660 from a second side of the first lower support member 620, and a second end of the third lower support member 640 penetrates through the third support bracket 650 from the first end of the third lower support member 640 and extending frontward, so that the second end of the third lower support member 640 is coupled to the first bracket 615 disposed in the first side.

A first end of the fourth lower support member 645 is inserted to the fourth support bracket 660 from between the second lower support member 630 and the third lower support member 640, and a second end of the fourth lower support member 645 penetrates through the third support bracket 650 from the first end of the fourth lower support member 645 and extending frontward, so that the second end of the fourth lower support member 645 is coupled to the first bracket 615 disposed in the second side.

Each of opposite sides of the third support bracket 650 is partially bent frontward and protrudes rearward to form an arch shape, and the third support bracket 650 is configured to surround a space that is connected to a vehicle frame through a swivel apparatus.

In a space between the fourth support bracket 660 and the front brackets 615, the third support bracket 650 is connected to the first, the second, the third, and the fourth lower support member 620, 630, 640, and 645, and the second tube is coupled to an upper portion of the third support bracket 650.

A first end portion of the fourth support bracket 660 is coupled to the first, the second, the third, and the fourth lower support member 620, 630, 640, and 645 from rearward of the third support bracket 650, and a second end portion of the fourth support bracket 660 is slantly extending rearward and upward from the first end portion of the fourth support bracket 660 and coupled to the rotation shaft 605.

The second tube 700 has portions of opposite sides protruding frontward in a quadrangle plate shape and a sealed space connected to the first hose 480 is formed inside of the second tube 700, and is coupled to the top portion of the third support bracket 650.

The second tube 700 is inflated upward when air is supplied through the second hose 680, and is gradually transformed to a structure having an oval shape cross-section and moves the second mat 750 upward.

the second mat 750 has a first end portion rotatably coupled to a front side of the opposite sides of the third support bracket 650 with respect to a shaft extending a first side or a second side thereof, and has a second end portion slantly extending rearward and upward of the second tube 700.

The pump 800 is formed in a cylindrical shape extending frontward or rearward, coupled to the downward of the second side of the third support bracket 350 or coupled to the cushion frame 24, and respectively connected to the first tube 400 and the second tube 700 by the first hose 480 and the second hose 680.

When the pump 800 is driven and air is supplied only to the second hose 680, the second tube 700 is inflated upward, and the second end portion of the second mat 750 is moved upward with respect to a shaft that is the first end portion of the second mat 750, so that the buttocks of an occupant is supported.

When the pump 800 is driven and air is supplied only to the first hose 480, the first tube 400 is inflated frontward, and the lower portion of the first mat 450 is moved frontward with respect to the rotation shaft 365, so that the lumbar or a back of an occupant is supported.

Therefore, with an operation of the single pump 800, the support assembly 100 may inflate the first tube 400 and the second tube 700 at the same time or may inflate any one of the first tube 400 or the second tube 700, so that there are advantages in that a volume, a weight, a cost thereof is lower comparing to a mechanical support assembly that requires a plurality of actuators.

In addition, the first mat 450 and the second mat 750 have an advantage of preventing a body of an occupant from shaking that is caused by air movement inside the first tube 400 and the second tube 700.

Meanwhile, the first mat 450 may be coupled to the first support portion 300 or the seat back frame 22 through a rail so as to allow a sliding movement frontward or rearward, and the second mat 750 may be coupled to the second support portion 600 or the cushion frame 24 through a rail so as to allow a sliding movement upward or downward.

While the exemplary embodiments of the present disclosure have been described above, specific structural and functional descriptions of the embodiments of the present disclosure disclosed herein are only for illustrative purposes of the embodiments of the present disclosure, and the present description is not intended to represent all of the technical spirit of the present disclosure. On the contrary, various modifications, equivalents, additions, and substitutions are possible, without departing from the scope and spirit of the present disclosure. Therefore, the embodiments of the present disclosure have been described for illustrative purposes, and should not be construed as being restrictive. The scope of the present disclosure is defined by the accompanying claims rather than the description which is presented above. Accordingly, various alternatives, modifications, equivalents, and other embodiments that may be included within the spirit and scope of the present disclosure as defined by the appended claims.

What is claimed is:

1. A support driver coupled to a seat frame, the support driver comprising:
   a support portion coupled to the seat frame;
   a tube coupled to the support portion; and
   a mat coupled to the support portion so as to allow the mat to be movable in a direction that is away from the support portion or in a direction that is adjacent to the support portion, with the tube being provided therebetween,
   wherein the tube is configured to push the mat by being inflated according to an operation of a pump that is connected to the tube by a hose;
   wherein the support portion includes a first support portion coupled to a seat back frame, the tube comprises a first tube coupled to a front side of the first support portion, and the mat comprises a first mat coupled to the first support portion so as to be movable frontward and rearward from front of the first tube;
   wherein the first support portion includes:
   a first support bracket coupled to the seat back frame from a rear side of the first tube; and
   a second support bracket rotatably coupled to the first mat from an upper portion of the first support bracket with respect to a shaft extending toward opposite sides of the shaft.

2. The support driver of claim 1, wherein the support portion is formed in a quadrangle plate shape and coupled to the seat frame, and is rotatably coupled to the mat.

3. A support assembly comprising:
   the support driver of claim 1, wherein the support driver of claim 1 is a first support driver; and
   a second support driver comprising:
   a second support portion coupled to a cushion frame;
   a second tube coupled to an upper portion of the second support portion; and
   a second mat coupled to the second support portion so as to be movable upward and downward from a top portion of the second tube; and
   a pump coupled to a lower portion of the cushion frame and configured to supply air by being connected to the first tube and to the second tube by a hose.

4. The support assembly of claim 3, wherein the second support portion comprises:
   a third support bracket coupled to a front side of the cushion frame from a lower portion of the second tube and rotatably coupled to the second mat; and
   a fourth support bracket having a first end coupled to a rear side of the third bracket, and having a second end formed in a hook shape and coupled to a rear side of the cushion frame.

5. The support assembly of claim 4, wherein the second mat has a first end formed in a plate shape and a portion of a front border of the second mat is rotatably coupled to the third support bracket, and the second mat has a second end extending rearward and upward from the first end thereof by a predetermined distance.

6. The support assembly of claim 4, wherein each of opposite sides of the third support bracket is partially bent frontward and protrudes rearward to form an arch shape.

* * * * *